United States Patent [19]

Packer

[11] 3,910,644
[45] Oct. 7, 1975

[54] ANTI-SKID BRAKE CONTROL SYSTEMS

[75] Inventor: Mervyn Brian Packer, Leamington Spa, England

[73] Assignee: Automotive Products Co. Ltd., Leamington Spa, England

[22] Filed: Apr. 24, 1973

[21] Appl. No.: 353,960

[30] Foreign Application Priority Data

Apr. 25, 1972 United Kingdom............... 19129/72

[52] U.S. Cl................................. 303/21 BE; 303/20
[51] Int. Cl.$^2$............................................ B60T 8/08
[58] Field of Search ................. 188/181; 303/20, 21; 317/5; 324/161-162; 340/53, 262-263, 62

[56] References Cited
UNITED STATES PATENTS

| | | | |
|---|---|---|---|
| 3,540,781 | 11/1970 | Okamoto et al................ | 303/21 BE |
| 3,556,610 | 1/1971 | Leiber............................... | 303/21 P |
| 3,635,530 | 1/1972 | Packer et al. ..................... | 303/21 P |
| 3,702,205 | 11/1972 | Arai et al.......................... | 303/21 BE X |
| 3,744,851 | 7/1973 | Burckhardt et al.............. | 303/21 BE |
| 3,764,817 | 10/1973 | Nakamura et al................ | 303/20 X |
| 3,768,872 | 10/1973 | Urban et al....................... | 303/21 BE |
| 3,768,873 | 10/1973 | Hirzel............................... | 188/181 LX |

Primary Examiner—Trygve M. Blix
Assistant Examiner—Stephen G. Kunin
Attorney, Agent, or Firm—Lawrence J. Winter

[57] ABSTRACT

In a fluid pressure vehicle braking system of the kind in which an electrical system associated with wheels of the vehicle is arranged to regulate the braking force applied to each associated wheel and is operable automatically to effect release of a brake acting on each associated wheel when the deceleration thereof exceeds a predetermined amount and to re-apply the released brake when the angular velocity of the respective wheel approaches that at which the periphery of the wheel rolls on the road surface without slipping, there is provided an override control which monitors the speeds of the vehicle wheels, compares them with a reference signal related to the speed of the vehicle, and holds the brakes released from a wheel if the speed of the vehicle exceeds the speed of that wheel by a predetermined amount for a predetermined period of time. The reference signal may be derived by any one of a number of methods. For example, the reference signal may be the speed of the fastest wheel. The brakes applied to the other wheels may be released at the same time or may operate undisturbed.

15 Claims, 7 Drawing Figures

ANTI-SKID BRAKE CONTROL SYSTEMS

This invention relates to fluid pressure operated braking systems for vehicles. The fluid pressure operated braking systems are of the kind which includes at least one electrical system associated with a wheel or group of wheels of the vehicle and arranged to regulate the braking force applied to the associated wheel or wheels, the or each electrical system being operable automatically to effect release of a brake or brakes acting on the associated wheel or wheels when the deceleration thereof exceeds a predetermined amount and to reapply the released brake or brakes when the angular velocity of the respective wheel approaches that at which the periphery of the wheel rolls on the road surface without slipping.

In theory, for optimum braking performance, the brakes should be re-applied when the degree of slip between the respective wheel and the road surface is reduced to that which permits maximum adhesion of the tyre surface to the road surface. A braking system designed to achieve such re-application of the brakes at all times is not practical because the tendency of a wheel to slip on a road surface varies with the nature of the road surface, and it is not practical to monitor the nature of the raod surface.

Accordingly fluid pressure braking systems of the kind referred to usually are designed for optimum braking performance when the vehicle being slowed down is following a straight path on a reasonable road surface, released brakes being arranged to be re-applied when the acceleration or speed of the respective wheel reaches a value which is computed by the associated electrical system from the speed of the respective wheel when the respective wheel first tended to skid, from the deceleration of the wheel when the brakes were released, and from the nature of the road surface upon which optimum braking performance is designed to be achieved. Furthermore in order to allow for the inevitable time delay between the production of a signal for brake re-application and actual re-application of the brakes to the wheel, the electrical system is arranged to emit the signal for actuation of the brake mechanism to re-apply the brakes, before the acceleration or speed of the respective wheel reaches the computed value.

If the degree of slip between the wheel and the road surface is greater than is so under the conditions for which the fluid pressure braking system is designed to achieve optimum braking performance, the brakes will be re-applied to the wheel before the acceleration of the wheel reaches the computed value. The wheel will tend to skid again following such premature re-application of the brakes so that the brakes will be released once more. It will be understood that such premature re-application of the brakes may recur indefinately.

It is an object of this invention to minimise the likelihood of recurrent premature reapplication of the brakes occuring on a wheel of a vehicle fitted with a fluid pressure braking system of the kind referred to.

According to one aspect of this invention there is provided a fluid pressure braking system of the kind referred to, wherein signals indicative of the angular velocity of the or each said wheel are monitored, a reference signal related to the speed of the vehicle is produced, the signal indicative of the angular velocity of the or each said wheel is compared with the reference signal, and, if the magnitude of the reference signal exceeds the magnitude of the signal indicative of the angular velocity of one or more of said wheels by more than a predetermined amount, operation of the electrical system associated with the one or more of said wheels is modified so that the brake or brakes regulated thereby are released and not re-applied, the arrangement being such that the electrical system continues to operate normally to release and re-apply the brake or brakes to the associated wheel or wheels whilst the magnitude of the signal indicative of the angular velocity of said one or more of said wheels is greater than the reference signal less said predetermined amount.

Preferably operation of the electrical system or systems associated with said one or more of said wheels is not modified until the magnitude of the reference has exceeded the magnitude of the signal indicative of the angular velocity of said one or more of said wheels by said predetermined amount for a predetermined interval of time. Said predetermined amount may be reduced with retardation of the vehicle. The predetermined amount by which the reference signal must exceed the angular velocity of a wheel before operation of the electrical system associated with that wheel is modified may be selected so as to allow for the difference between the angular velocity of the two co-axial wheels as the vehicle is cornering.

The reference signal may be computed by a said electrical system from the speed of the vehicle when the wheel with which the said electrical system is associated first tended to skid. Alternatively, the reference signal may be computed from the angular velocities of a wheel or a variety of wheels of the vehicle.

Preferably the reference signal with which the signal indicative of the angular velocity of one wheel of the vehicle is compared is computed from the angular velocities of one or more of the other wheels of the vehicle.

The fluid pressure braking system may include an override control circuit associated with the or each electrical system, the or each override control circuit generating the respective reference signal or signals and modifying operation of the respective electrical system or systems.

The or each override control circuit may generate the respective reference signal by storing the peaks of the signals indicative of the angular velocities of the wheel or wheels from which the reference signal is computed and by making a controlled discharge of the stored peaks as the reference signal which comprises the stored peaks interconnected by the decay links which correspond to a deceleration of the vehicle. The peaks of the or each signal indicative of the angular velocities of the wheel or wheels from which the or each reference signal is computed may be stored in a respective capacitor, and a constant current generator may be associated with the or each capacitor in order to control the discharge of the capacitor. The discharge from the or each capacitor may be determined by the setting of a respective variable resistor. The resistance of each variable resistor may be set by a common slope control device which may fix the resistance of the variable resistor so that it corresponds to a predetermined deceleration of the vehicle, or which may be coupled to a decelerometer and arranged to vary the resistance of the variable resistor in accordance with variations in the actual deceleration of the vehicle sensed by the decelerometer.

The controlled discharge from the or each capacitor to which were fed the signals indicative of the angular velocities of the wheel or wheels from which the reference signal is computed may be fed to a combined summation, amplification and inversion device which adds together the various signals it receives from the capacitors, inverts and amplifies the resultant signal and transmits the inverted amplified signal to a comparator where it is compared with the signal indicative of the angular velocity of said one wheel. The or each capacitor may be connected to the combined summation, amplification and inversion device by a switching means, the arrangement being such that the shape of the reference signal is dependent upon the setting of the switching means. The combined summation, amplification and inversion device may include a feedback circuit and means for changing the resistance of the feedback circuit so as to influence the magnitude of the inverted amplified signal.

The sum of the inverted amplified signal and the signal indicative of the angular velocity of said one wheel may be compared with a third signal in the comparator, the third signal being representative of said predetermined amount. A potentiometer may have its pointer connected to the comparator so that it supplies said third signal.

The output of the comparator may be connected through a time delay circuit to the means arranged to regulate operation of the brakes applied to said one wheel, the time delay circuit being arranged to transmit an output signal from the comparator to the brake regulating means so as to actuate the brake regulating means for release of the associated brakes, and so that initiation of transmission of a signal to the brake regulating means is delayed for said predetermined interval of time, there being no delay in cessation of the signal transmitted to the brake regulating means after cessation of the output signal from the comparator. The output of the comparator may be connected through a time delay circuit to a warning device, the time delay circuit being arranged to transmit an output signal from the comparator to the warning device after the elapse of a determined period of time and so that, after cessation of the output from the comparator, there is no delay in cessation of any signal transmitted to the warning device. The time delay circuit may include an input terminal connected in parallel to two inputs of an AND gate, the input terminal being connected to one of the inputs of the AND gate via resistance means, capacitance means having one terminal connected between the resistance means of said one input so as to be charged by current flowing from said input terminal to said one input via said resistance means, and a shunt circuit in parallel with the resistance means providing a shunt connection between the input terminal and said terminal of the capacitance means, the shunt circuit including a diode which permits free discharge of the capacitance means to the input terminal but which prevents current flow from the input terminal via the shunt circuit to charge the capacitance means, the arrangement being such that initiation of an output signal from the AND gate is delayed for a period after initial receipt of a signal at the input terminal until the capacitance means is charged sufficiently for the voltage at said one input of the AND gate to match the voltage at the other input, and such that there will be no output signal from the AND gate unless a signal is being received at the input terminal.

There may be a common override control circuit for two electrical systems, the reference signal being derived from the angular velocities of the wheels associated with the two electrical systems and the signals indicative of the angular velocity of each wheel being compared with the common reference signal.

We have found by experiment that, in practice, no two of the vehicles with which a fluid pressure braking system of the kind referred to is associated have the same angular velocity during operation of the fluid pressure braking system of the kind referred to. Thus, it would be apparent that the degree of slip between each said wheel and the road surface differs from the degree of slip between the others of said wheels and the road surface. Consequently it is conceivable that the brakes may be re-applied prematurely at least to the slowest of said wheels.

According to another aspect of this invention there is provided a fluid pressure braking system of the kind referred to which includes at least two electrical systems, a first of the electrical systems being associated with a first wheel or group of wheels of the vehicle and arranged to regulate the braking force applied to the associated wheel or wheels, and a second of the electrical systems being associated with a second wheel or group of wheels of the vehicle and arranged to regulate the braking force applied to the associated wheel or wheels, wherein signals derived from the angular velocity of each said wheel are monitored, the slowest of said wheels is identified, a reference signal is produced, the reference signal being related to the angular velocity of the other said wheel, or at least one of the others of said wheels, and thus being related to the speed of the vehicle, the signal indicative of the angular velocity of each said wheel is compared with the reference signal, and, if the magnitude of the reference signal exceeds the magnitude of the signal indicative of the angular velocity of one or more of said wheels by more than a predetermined amount, operation of the electrical system or systems associated with the one or more of said wheels is modified so that the brake or brakes regulated thereby are released and not re-applied, the arrangement being such that at least one of the electrical systems continues to operate normally to release and re-apply the brake or brakes to the associated wheel or wheels whilst the magnitude of the reference signal exceeds the angular velocity of said one or more of said wheels by more than a said predetermined amount.

According to yet another aspect of this invention there is provided a fluid pressure braking system of the kind referred to which includes at least two electrical systems, a first of the electrical systems being associated with a first wheel or group of wheels of the vehicle and arranged to regulate the braking force applied to the associated wheel or wheels, and a second of the electrical systems being associated with a second wheel or group of wheels of the vehicle and arranged to regulate the braking force applied to the associated wheel or wheels, wherein signals derived from the angular velocity of each said wheel are monitored, a reference signal related to the angular velocity of the fastest wheel and thus the speed of the vehicle is produced, the signal indicative of the angular velocity of each said wheel is compared with the reference signal, and, if the magnitude of the reference signal exceeds the magnitude of the signal indicative of the angular velocity of any one of said wheels by more than a predetermined amount, operation of each electrical system is modified so that the brake or brakes regulated thereby are released and not re-applied.

A number of embodiments of this invention will be described now by way of example only with reference to the accompanying drawings, of which.

Figure 1:
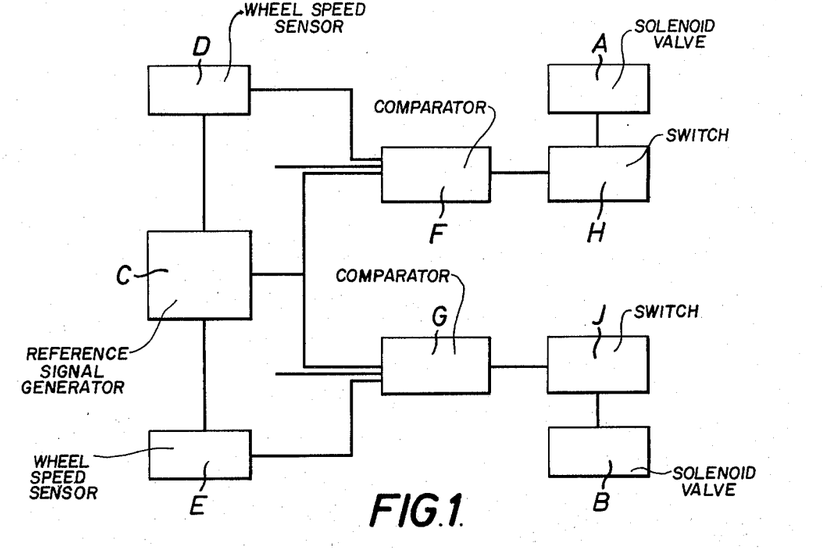
FIG. 1 is a diagram which illustrates one embodiment of fluid pressure braking system according to the invention for a vehicle.
Figure 2:
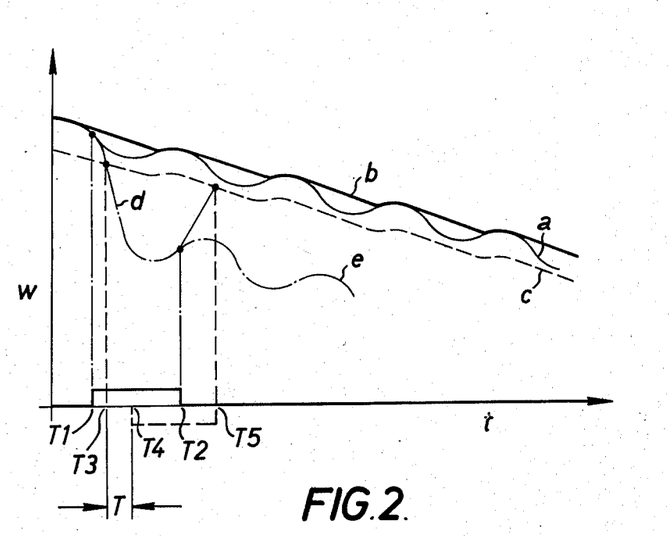
FIG. 2 is a graph illustrating operation of the embodiment of the invention illustrated in FIG. 1.

Referring to FIGS. 1 and 2, in one embodiment of the invention, the supply of fluid under pressure to the motor cylinder or cylinders of the brake or brakes on one wheel of a vehicle is controlled by one antilock control system which includes one solenoid operated control device which is arranged to ensure that, when its solenoid winding is energised, the pressure of fluid in the motor cylinder or cylinders is not sufficient to apply the brake or brakes to said one wheel, and the supply of fluid under pressure to another wheel of the vehicle is controlled by another antilock control system which is similar to said one antilock control system. Each of the two antilock control systems includes a device for sensing the acceleration of the associated wheel, the said device being arranged to emit a signal which energises the solenoid winding of the respective solenoid operated control devices when the deceleration of the associated wheel exceeds a predetermined amount. Normally a solenoid winding of a solenoid operated control device, which has been energised by a signal from the respective acceleration sensing device, is deenergised, so that the respective brake or brakes are re-applied, when the associated wheel has accelerated up to a speed which is computed by the respective antilock control system to approximate to the speed of the vehicle at that time.

A common override control circuit is arranged to receive signals indicative of the angular velocities of two of the wheels of the vehicle and has two output terminals which are connected each to the solenoid winding of a respective one of the solenoid operable valves A and B which control the application of braking pressure to the two wheels. The common override control circuit includes reference signal generating means C arranged to receive signals indicative of the angular velocity of the two wheels from respective wheel speed sensors D and E, to store the peaks of the two signals (e.g., by charging respective capacitors), and to emit a reference signal derived from the stored peaks of the two signals inter-connected by decay links which conveniently correspond to a selected vehicle deceleration of 1g and which may be produced by a controlled discharge of the respective capacitor. The reference signal emitted approximates to the speed of the vehicle and is fed in parallel to one input terminal of each of two comparators F and G. A signal indicative of the angular velocity of one of the wheels is fed from the sensor D to another input terminal of the comparator F and a signal indicative of the angular velocity of the other wheel is fed from the sensor E to another input terminal of the other comparator G. The output terminal of the comparator F is connected to one switch H which is in series with the solenoid winding of the solenoid operated control device A, and the output terminal of the other comparator G is connected to another switch J which is connected in series with the solenoid winding of the solenoid operated control device B. The two switches H and J are arranged to be switched on by an output signal from the respective comparator F or G, the switching on of each switch H, J being delayed by a respective time delay mechanism. The two switches H and J are switched off without delay by termination of an output signal from the respective comparator F or G. Switching on of each switch H,J is arranged H,J energise the solenoid winding of the respective solenoid operated control device A,B.

The operation of the invention is illustrated by Fig. 2 which is a graph of the angular velocity of one of the wheels ($w$) against ($t$) time.

The curve $a$ represents the desired pattern of the angular velocity of the wheel whilst the vehicle is being retarded by the brake or brakes on that wheel, operation of the or each brake being controlled by the respective anti-skid control system. If the actual angular velocity of the wheel approximates to that represented by the curve $a$, under the control of the respective solenoid operable control valve, the normal operation of the anti-skid control means will not be overridden by operation of the override control circuit.

The curve $b$ represents the reference signal which is derived from the stored peaks of the two wheel speed signals, interconnected by decay links which correspond to a vehicle deceleration of the order of 1g. The curve $c$ is the offset curve which comprises the curve $b$ less a predetermined constant. The actual angular velocity of the wheel is represented by the curve $d$, and the chain dotted extension $e$ shows what would happen if the normal operation of the solenoid operable valve was not overridden by the override control circuit.

When the antilock control system senses a tendency for the wheel to skid at time T1, the solenoid winding of the respective solenoid operable valve is energised and the brakes released. Normally the released brakes are re-applied at T2 under the control of the associated antilock control system.

If the signal $d$ indicative of the angular velocity of one of the two wheels falls below the reference signal $b$ by more than a predetermined amount, (that is falls below curve $c$, as shown at time T3 in FIG. 2), the respective comparator F,G emits an output signal. Providing that the angular velocity $d$ of the slower wheel stays below the curve $c$ for more than the time delay T of the respective switch H,J, the switch H,J is switched on at time T4 after the elapse of the time delay T, the solenoid winding of the associated solenoid operated control device A,B is energised by the override control circuit and the brakes are held released. If the wheel speed *d* is below the curve *c* at time T2 when the brakes would be re-applied normally, the brakes continue to be held released by the action of the override control circuit. As soon as the angular velocity *d* of the associated wheel speeds up to the predetermined amount less than that represented by the reference signal (that is reaches the curve *c* at time T5), the output from the respective comparator F,G ceases so that the switch H,J is switch off, and the brakes are reapplied. If the angular velocity of the associated wheel reaches the predetermined amount less than that represented by the reference signal *b* before the time delay T has elapsed, the switch H,J is not switched on and the brakes are not released. The comparators F and G do not emit an output signal unless the speed represented by the reference signal *b* exceeds the angular velocity *d* of the respective wheel by more than the predetermined amount.

The predetermined amount less than the reference signal is selected so as to allow for the difference between the angular velocities of the two wheels as the vehicle is cornering.

Figure 3:
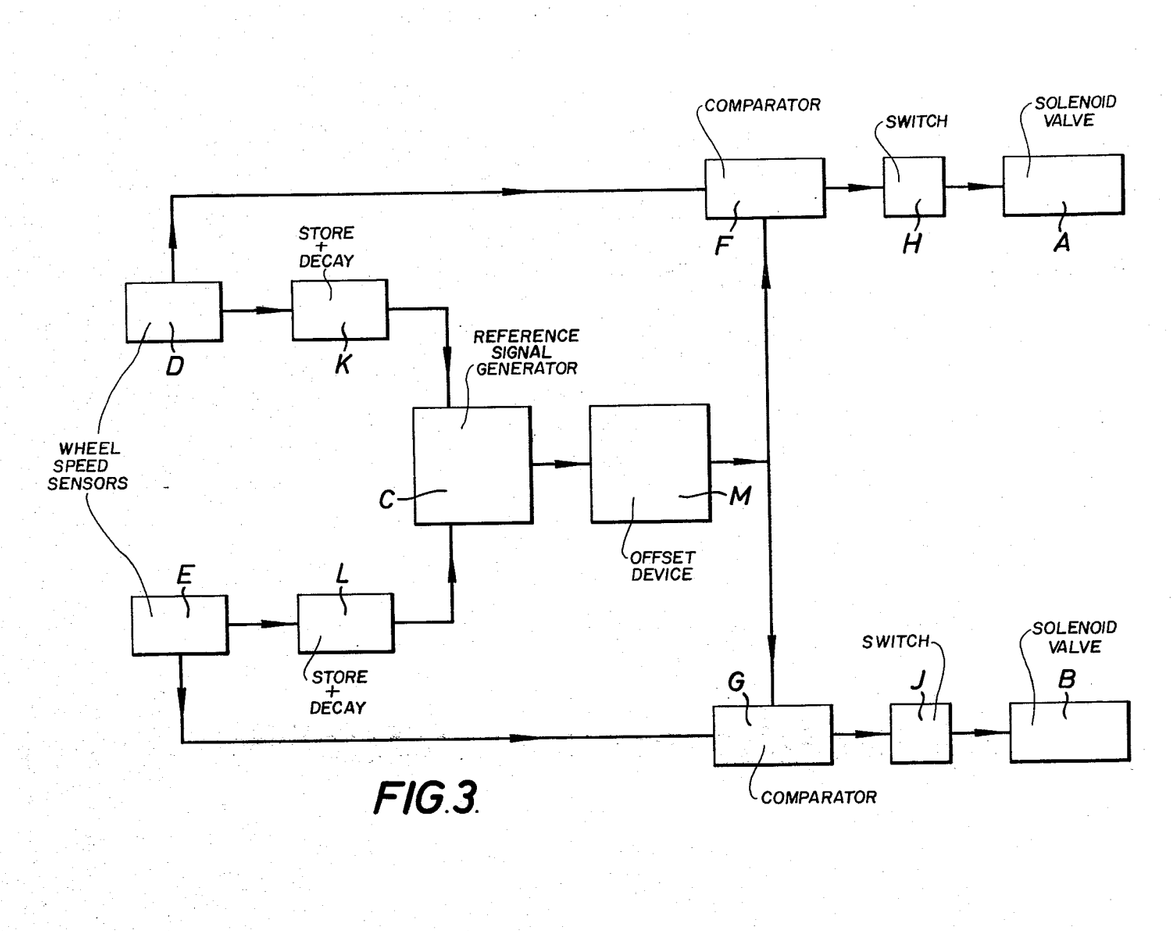
FIG. 3 is a diagram which illustrates a second embodiment of fluid pressure braking system according to this invention for a vehicle.

In a second embodiment of this invention which will be described now with reference to FIG. 3, the override control circuit differs from that described above with reference to FIG. 1 in that the signal indicative of the angular velocity of each wheel is fed to a respective store and decay device K,L which stores the peaks of the angular velocity of the respective wheel and emits a signal which comprises the stored peaks interconnected by suitable decay links. The reference signal generating means C receives the signals emitted by the two store and decay devices K and L, rejects the lower and passes the higher signal to an offset device M which deducts the predetermined amount from the higher signal and emits a reference signal which is related to the speed of the vehicle and comprises the higher of the signals emitted by the two store and decay devices K and L less the predetermined amount.

Figure 4:
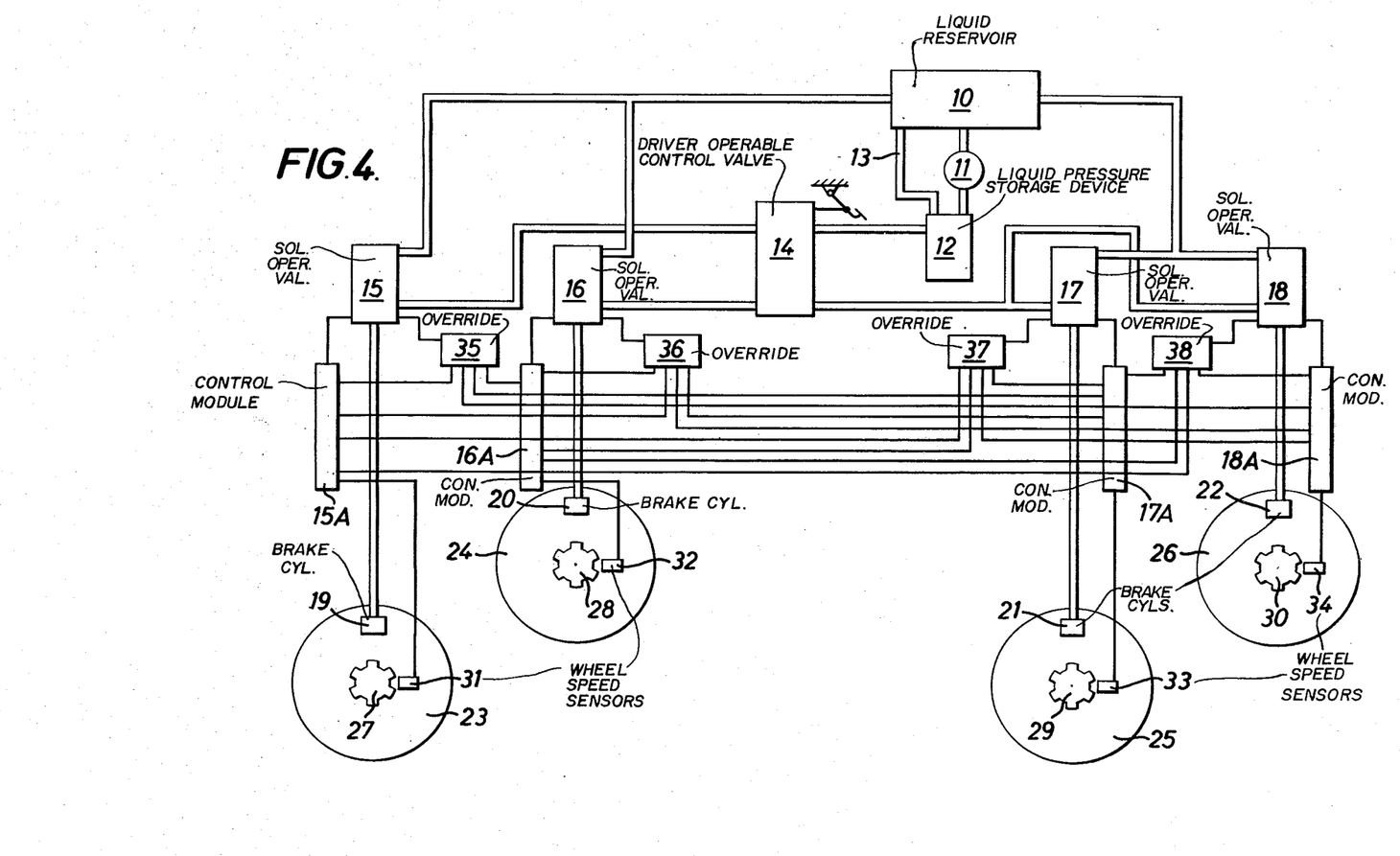
FIG. 4 is a diagram which illustrates a third embodiment of fluid pressure braking system according to this invention for a four wheeled vehicle.

Referring to FIG. 4, another embodiment of fluid pressure braking system comprises a liquid reservoir 10, a liquid pump 11 connected between the reservoir 10 and a liquid pressure storage device 12. The pump 11 may be driven by the engine of the vehicle, or by an electric motor and is arranged to draw liquid from the reservoir 10 and feed it to the liquid pressure storage device 12. The storage device 12 includes an accumulator, which is arranged to store liquid under pressure and an unloader valve which returns pump output to the reservoir 10 via conduit 13 when the accumulator is fully charged. The accumulator is connected to a driver operable control valve 14 which is operable to feed liquid under pressure through a respective one of four solenoid operable control valves 15, 16, 17 and 18 to the brake operating motor cylinders 19, 20, 21 and 22 which are mounted respectively on the four wheels 23, 24, 25 and 26 of the vehicle. It will be understood that, when the brakes are applied by the driver, the brake application control valve 14 is actuated and normally liquid pressure is fed to the motor cylinders 19, 20, 21 and 22 which operate to apply the brakes.

Each wheel 23, 24, 25 and 26 has an associated toothed wheel 27, 28 29 and 30 fixed either to the axle or the wheel hub for rotation with the wheel. Four magnetic pick-up devices 31, 32, 33 and 34 are mounted on the body of the vehicle. Each pickup device 31, 32, 33, 34 is located adjacent to a respective one of the toothed wheels 27, 28, 29, 30 so as to co-operate with the teeth thereof and emit a series of pulses as the respective toothed wheel 27, 28, 29, 30 rotates. The frequency of the pulses emitted by each pick-up device 31, 32, 34 is a measure of the angular velocity of the respective wheel 23, 24, 25 or 26. The output terminal of each pick-up device 31, 32, 33, 34 is connected to a terminal of a control module 15A, 16A, 17A, 18A associated with the solenoid operable control valve 15, 16, 17 18 which controls the supply of fluid pressure to the motor cylinder 19, 20, 21, 22. Each control module 15A, 16A, 17A, 18A is arranged to monitor the signals emitted by the respective pick-up device 31, 32, 33,, 34 and to energise the solenoid winding of the respective solenoid operable control valve 15, 16, 17, 18 when the deceleration of the respective wheel exceeds a predetermined amount which is an indication that the respective wheel 23, 24, 25, 26 is tending to skid. When the solenoid winding of each solenoid operable control valve 15, 16, 17 or 18 is energised, the supply of liquid pressure from the driver operable control valve 14 to the respective brake operating motor cylinder 19, 20, 21, 22 is interrupted, and the brake operating motor cylinder 19, 20, 21, 22 is connected to the reservoir 10 so that the braking pressure applied to the associated wheel 23, 24, 25, or 26 is reduced. Thus the deceleration of the respective wheel 23, 24, 25 or 26 is reduced and the wheel accelerates towards the speed of the vehicle. At a time interval after energisation of one of the solenoid windings, which is computed by the control module, the solenoid winding is deenergised and liquid pressure fed once more to the respective brake operating motor cylinder 19, 20, 21, 22.

The various parts of the fluid pressure braking system described so far with reference braking system described so far with reference to FIG. 4 have been proposed previously. In addition, this embodiment of the present invention has an override control circuit 35, 36, 37 or 38 associated with each solenoid operable control valve 15, 16, 17 or 18. Each override control circuit has four input terminals which are connected respectively to a respective output terminal of the four control modules 15A, 16A, 17A, and 18A, and an output terminal which is connected to the solenoid winding of the respective solenoid operable control valve 15, 16, 17, 18.

Figures 5, 6:
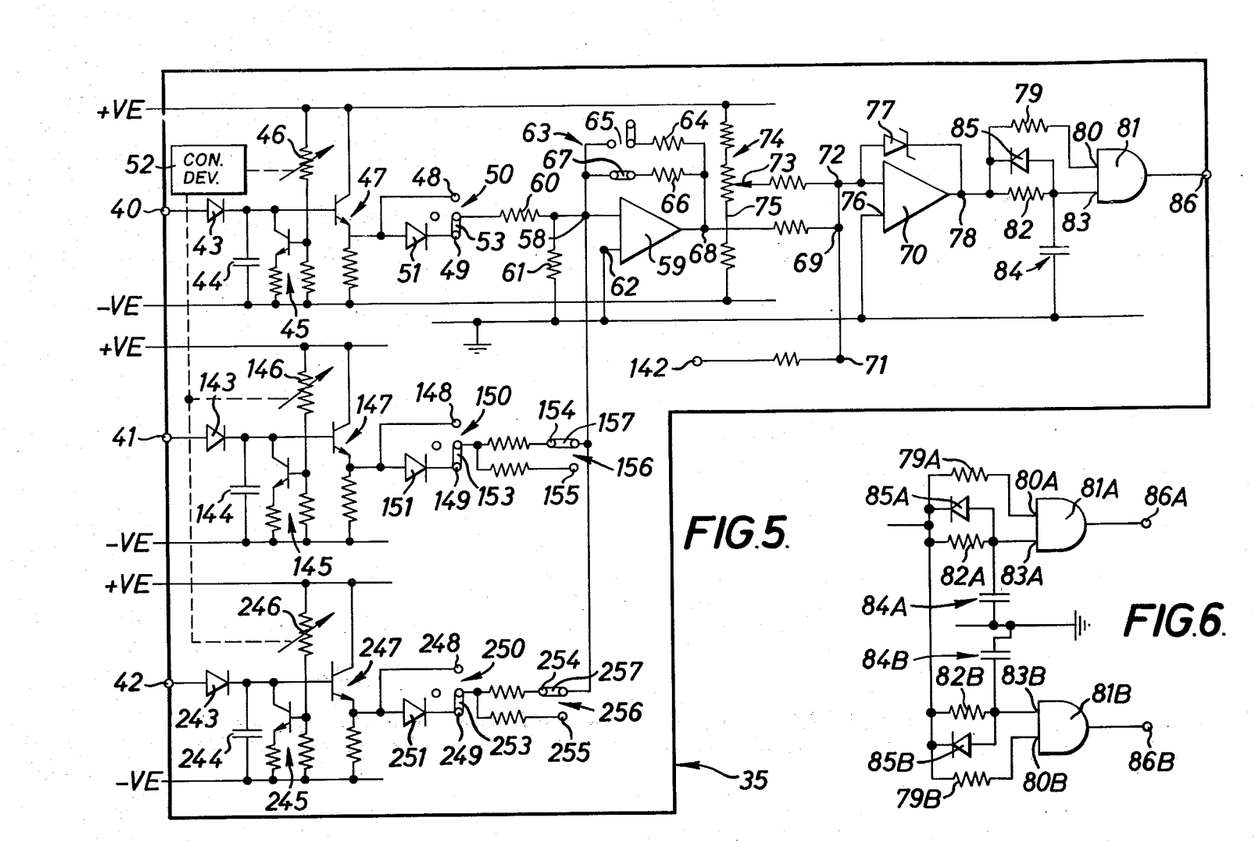
FIG. 5 is a circuit diagram which illustrates a typical override control circuit for brakes of the braking system shown in FIG. 4 which are for a wheel of the vehicle.
FIG. 6 illustrates a modification of part of the override control circuit shown in FIG. 5.

Referring now to FIG. 5, which is a circuit diagram of the override control circuit 35, the input terminal 40 is connected to the control module 17A which is associated with the wheel 25, the input terminal 41 is connected to the control module 18A which is associated with the wheel 26, the input terminal 42 is connected to the control module 16A which is associated with the wheel 24, and the input terminal 142 is connected to the control module 15A which is associated with the wheel 23.

A signal, which is indicative of the angular velocity of the wheel 25 and which is received at the terminal 40 is fed through a diode 43 to one terminal of a capacitor 44 which has its other terminal connected to the negative terminal of a source of electrical potential. The capacitor 44 is charged by the signal and it retains peaks of the signal fed to it. The capacitor 44 discharges as the speed signal drops from each peak signal stored by the capacitor 44. The diode 43 prevents the capacitor 44 discharging through the terminal 40.

Discharge of the capacitor 44 between successive peak speed signals which charge the capacitor 44 is controlled by a constant current generator 45 which comprises a transistor connected in parallel with the capacitor 44, the emitter of the transistor being connected to the negative terminal of the source of electrical potential through one fixed resistor, the base of the transistor being connected to the negative terminal of the source of electrical potential through another fixed resistor and being connected to the positive terminal of the source of electrical potential through a variable resistor 46, and the collector of the transistor being connected between the base of another transistor 47 and the diode 43. The other transistor 47, which has its emitter connected through a fixed resistor to the negative terminal of the source of electrical potential, and its collector connected to the positive terminal of the source of electrical potential, serves as an emitter follower. The emitter of the transistor 47 is connected also to two fixed contacts 48 and 49 of a three pole change-over switch 50, the emitter being connected directly to the fixed contact 48, and through a diode 51, to the fixed contact 49.

The output signal from the emitter of the transistor 47, which is fed to the fixed contacts 48 and 49, is derived from the peak signals received at the input terminal 40, which are indicative of the peak actual speeds of the wheel 25, and comprises those peaks interconnected by decay links which are indicative of an optimum speed of the wheel 25 which would be derived by slowing down the wheel 25 from each actual peak speed at a predetermined deceleration until the next peak occurs. The predetermined deceleration is dependent upon the resistance of the variable resistor 46, which is set by a control device 52.

The input terminal 41 is connected to two fixed contacts 148 and 149 of another three pole changeover switch 150 by similar circuitry which includes a diode 43, a capacitor 144, a constant current generator 145, a variable resistor 146, an emitter follower 147 and another diode 151. The input terminal 41 receives a signal which is indicative of the angular velocity of the wheel 26. It will be appreciated that the output signal from the emitter of the transistor 147, which is fed to the fixed contacts 148 and 149, comprises the peaks of the signals received by the input terminal 41, which are indicative of successive peak velocities of the wheel 26, interconnected by decay links which are indicative of an optimum speed of the wheel 26 which would be derived by slowing down the wheel 26 from each actual peak signal at a predetermined deceleration until the next peak occurs. The predetermined deceleration is dependent upon the resistance of the variable resistor 146, like that of the variable resistor 46, is set by the control device 52.

The input terminal 42 is connected to two fixed contacts 248 and 249 of a third 3 pole changeover switch 250 by similar circuitry which includes a diode 243, a capacitor 244, a constant current generator 245, a variable resistor 246, an emitter follower 247 and another diode 251. The input terminal 42 receives a signal which is indicative of the angular velocity of the wheel 24. It will again be appreciated that the output signal from the emitter of the transistor 247, which is fed to the fixed contacts 248 and 249, comprises the peaks of the signals received by the input terminal 42, which are indicative of successive peak velocities of the wheel 24, interconnected by decay links which are indicative of an optimum speed of the wheel 24 which would be derived by slowing down the wheel 24 from each actual peak signal at a predetermined deceleration until the next peak occurs. The predetermined deceleration is dependent upon the resistance of the variable resistor 246, which like that of the variable resistors 46 and 146, is set by the control device 52.

The movable contact 153 of the 3 pole changeover switch 150 is connected in parallel to the two fixed contacts 154 and 155 of a double pole changeover switch 156. The movable contact 253 of the 3 pole changeover switch 250 is connected in parallel to the two fixed contacts 254 and 255 of another double pole changeover switch 256.

The movable contact 53 of the 3 pole changeover switch 50, the movable contact 157 of the 2 pole changeover switch 156 and the movable contact 257 of the 2 pole changeover switch 256 are all connected to one input terminal 58 of an integrated circuuit 59, the movable contact 53 being connected to the terminal 58 via a fixed resistor 60. The input terminal 58 of the integrated circuit 59 is connected to earth through a high ohmic value fixed resistor 61 and another terminal 62 of the integrated circuit 59 is connected to earth also. A feedback circuit 63 which comprises a series connected fixed resistor 64 and switch 65 in parallel with a series connected fixed resistor 66 and switch 67, is connected between the output terminal 68 of the integrated circuit 59 and the input terminal 58.

The integrated circuit 59 is a standard integrated circuit which operates to add together all the signals fed to the input terminal 58, and which amplifies and inverts the total to produce an output signal.

It will be apparent that the setting of the switches 50, 150 aand 250 determines which signals are fed to the input terminal 58 of the integrated circuit 59 and thus influences the shape of the output signal from the integrated circuit 59. The shape of the output signal from the integrated circuit 59 is dependent also upon the setting of the switches 157 and 257. Each of the diodes 51, 151 and 251 is arranged so that, when the movable contact 53, 153 and 253 of the respective switch 50, 150 or 250 is engaged with the respective fixed contact 49, 149 or 249, the respective signal fed to the input terminal 58 of the integrated circuit 59 is constituted by the successive peak values of the signals emitted by the respective transistor 47, 147, 247. Assuming that a signal is supplied to the input terminal 58 from each switch 50, 150 and 250, the magnitude of the output signal from the integrated circuit 59 is dependent upon the resistors 60 and 61, the effective resistance of the feedback circuit 63 (and thus upon the setting of the switches 65 and 57) and the resistors connected between the movable contacts 153 and 253 and the fixed contacts engaged by the movable contacts 157 and 257, as well as the magnitude of the signals emitted by the transistors 47, 147 and 247, and the amplification characteristics of the integrated circuit 59. It will be appreciated that the output signal from the integrated circuit 59 is related to the speed of the vehicle.

The output terminal 58 of the integrated circuit 70. The input terminal 142 of the override control circuit, which receives a signal that is indicative of the angular velocity of the wheel 23, is connected through another fixed resistor to the input terminal 72 and which also is connected through a third fixed resistor to the pointer 73 of a potentiometer 74 which has its resistance wire 75 connected across the source of electrical potential. A second input terminal 76 of the integrated circuit 70 is connected to earth.

The integrated circuit 70 has a feedback circuit, including a zener diode 77, and an output terminal 78. The output terminal 78 is connected through one fixed resistor 79 to one input terminal 80 of an AND gate 81, and through another fixed resistor 82 to the other input terminal 83 of the AND gate 81. A capacitor 84 has one terminal connected between the fixed resistor 82 and the terminal 83 of the AND gate 81, and its other terminal earthed. A diode 85, in parallel with the fixed resistor 82, is arranged to provide a discharge path for the capacitor 84 which by-passes the fixed resistor 82, whilst ensuring that current to charge the capacitor 84 is fed through the fixed resistor 82. The output terminal 86 of the AND gate 81 is in series with the solenoid winding of the solenoid operable valve 15.

The integrated circuit 70 functions as a comparator which compares the voltage at the pointer 73 of the potentiometer 74 with the sum of the voltages of a signal received from the input terminal 142, which is related to the angular velocity of the wheel 23, and of a signal received from the output terminal 68 of the integrated circuit 59 which, being derived from signals indicative of the angular velocities of one or more of the other wheels of the vehicle, is a reference signnal related to the speed of the vehicle.

If the voltage at the pointer 73 is less than the sum of the voltages of the other two signals, that is to say if the voltage of the signal which is indicative of the angular velocity of the wheel 23 is greater than the voltage of the reference signal less the predetermined voltage at the pointer 73, the integrated circuit 70 does not emit an output signal from its output terminal. Thus there is no output signal from the AND gate 81 and the solenoid operable valve 15 continues to function normally under the control of the associated control module, the override control circuit 35 having no influence upon the operation of the solenoid operable valve 15.

However, if the speed of the wheel 23 falls significantly below the speed of the vehicle so that the voltage of the signal which is indicative of the angular velocity of the wheel 23 is less than the voltage of the reference signal less the predetermined voltage at the pointer 73, so that the voltage at the pointer 73 is greater than the sum of the voltages of the other two signals fed to the integrated circuit 70, the integrated circuit 70 emits a positive output signal from its output terminal 78. The zener diode 77 limits the magnitude of the positive output signal from the integrated circuit 70 so as to avoid overloading the AND gate 81. The positive output signal is fed through the fixed resistor 79 to the input terminal 80 of the AND gate 81 and through the fixed resistor 82 to the capacitor 84 and the input terminal 83 of the AND gate 81. Initially the voltage at the capacitor 84 and the input terminal 83 of the AND gate 81 is low, because the capacitor 84 is not charged, whilst the voltage at the input terminal 80 is relatively high. If the angular velocity of the wheel 23 stays below the speed of the vehicle less the predetermined amount, which is represented by the voltage at the pointer 73, for a sufficient time interval, the output signal from the integrated circuit 70 charges the capacitor 84 to a level at which the voltage at the input terminal 83 matches the voltage at the input terminal 80 of the AND gate 81. The AND gate 81 emits an output signal when both its input terminals receive relatively high voltage signals. An output signal from the AND gate 81, energises the solenoid winding of the solenoid operable valve 15 so that the solenoid operable valve 15 is operated to relieve the braking pressure applied to the wheel 23 and action of the associated control module 15A is overridden byy the override control circuit 35 until the wheel 23 speeds up enough for its angular velocity to exceed the speed of the vehicle, less the predetermined offset which is represented by the voltage at the pointer 73. When the wheel 23 has speeded up sufficiently, the integrated circuit 70 ceases to emit an output signal and the voltage at the input terminal 80 of the AND gate 81 falls so that the AND gate 81 also ceases to emit an output signal and control of the operation of the solenoid operable valve 15 by the associated control module 15A is restored.

It will be appreciated that inclusion of the capacitor 84 in the circuit by which an output signal from the integrated circuit 70 is fed to the AND gate 81 results in there being a time delay between the initial emittance of an output signal by the integrated circuit 70 and the subsequent emittance of an output signal by the AND gate 81. Thus, if the wheel 23 speeds up so that its angular velocity is greater than the speed of the vehicle less the predetermined offset which is represented by the voltage at the pointer 73 before the capacitor 84 has been charged up to the level at which the AND gate 81 emits an output signal, the integrated circuit 70 ceases to emit an output signal and the action of the control module 15A associated with the solenoid operable valve 15 is not overridden unnecessarily by the override control circuit 35.

It should be understood that the detailed circuit arrangement of the override control circuit 35 described above with reference to FIG. 2 is a typical example of the circuit arrangement of each of the override control circuits 35, 36, 37 and 38.

In the override control circuit 36, the input terminal 40 is connected to the control module 18A the input terminal 41 is connected to the control module 17A, the input terminal 42 is connected to the control module 15A and the input terminal 142 is connected to the control module 16A. In the override control circuit 37, the terminal 40 is connected to the control module 15A, the terminal 41 is connected to the control module 16A, the terminal 42 is connected to the control module 18A and the terminal 142 is connected to the control module 17A. Finally in the override control circuit 38, the terminal 40 is connected to the control module 16A, the terminal 41 is connected to the control module 15A, the terminal 42 is connected to the control module 17A and the terminal 142 is connected to the control module 18A. The detailed arrangement and operation of each of the override control circuits 36, 37, and 38 will be apparent from the foregoing description of the arrangement and operation of the override control circuit 35.

A number of modifications of the override control circuits described above with reference to FIG. 5 may be incorporated.

For example, the slope control device may be operatively coupled to a decelerometer which measures the deceleration of the vehicle, so that the setting of the variable resistors 46, 146 and 246 may be related to the deceleration of the vehicle.

The circuitry may be simplified by omission of the switches 50, 150, 250, 156, 256, 65 and 67 if it is not necessary to provide the capability of choosing one of a number of possible reference signals. The potentiometer may be omitted if it is not necessary to provide means for setting a selected value of the reference signal voltage offset. If it is desired to relate the reference offset voltage to the speed of the vehicle, the resistance of the resistor between the terminals 142 and 69 and the resistor between the output 68 of the integrated circuit 59 may be varied one with respect to the other. Conveniently the change would be arranged so that the resistance of the first mentioned resistor would be reduced with respect to that of the other resistor as the vehicle slows down.

Although each override control circuit 35, 36, 37 and 38 has been described as including its own capacitor for storing peak signals indicative of wheel speeds, constant current generator for controlling the discharge of the said capacitor, and switching means for feeding the controlled discharge from the respective capacitor to the respective summation and inversion amplifier, there might be such a circuit common to all four wheels. The common circuit would receive the signals indicative of the velocities of the wheels and appropriate connection between the common device for the respective wheel, the speed sensing device for the respective wheel and the summation and inversion amplifier 59 for each wheel would be made.

Signals indicative of the speed of a wheel may be obtained from any suitable anti-skid control device in which a wheel speed signal is generated.

Apparatus according to this invention may be employed to indicate failure of an antilock control system associated with any one wheel of the vehicle, appropriate warning being given when the operation of the antilock control system is continuously being overridden by the override control circuit which would occur when that antilock control system failed, or when the means for producing a signal indicative of any one wheel failed. A suitable delay service would be incorporated if the apparatus were utilised to provide a warning of failure of the override control circuit so as to avoid production of the warning signal when the vehicle was stopped.

In the fluid pressure braking system described above with reference to FIGS. 4 and 5, each AND gate output of the override control circuits 35, 36, 37 and 38 may be connected to a warning device which is operable by an output signal from the respective AND gate in order to indicate that there is a fault in the operation of the normal antilock control system. FIG. 6 shows a modified form of time delay circuit which is suitable for use in place of the time delay circuit of the override control circuit described with reference to FIG. 5, which is a double version thereof and which has two output terminals 86A and 86B. The output terminal 86A is for connection to the solenoid winding of the respective solenoid operable valve 15, 16, 17 or 18, and the other output terminal 86B is for connection to a respective warning device. The components of the double time delay circuit shown in FIG. 6 have been given similar references to the corresponding parts of the time delay circuit of the override control circuit 35 described above with reference to FIG. 5, those components which are associated with the output terminal 86A have been identified by the letter A and those parts associated with the output terminal 86B have been identified by the letter B.

Figure 7:
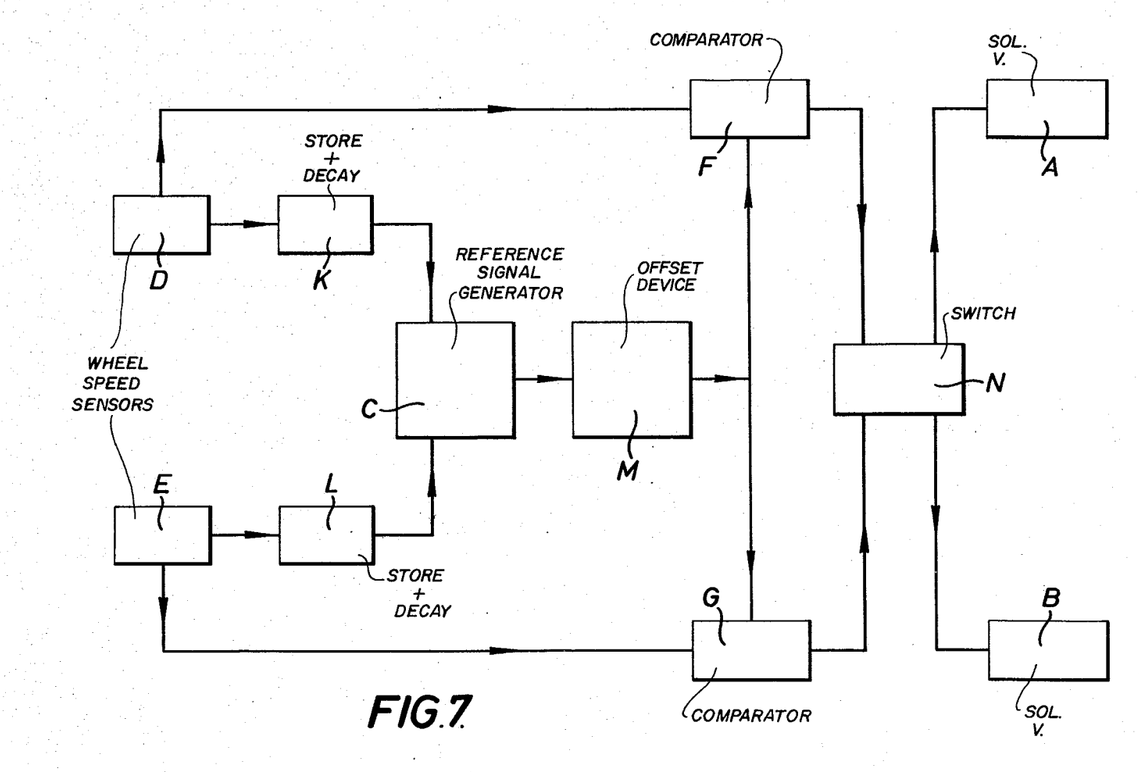
FIG. 7 is a diagram which illustrates a modified form of the embodiment shown in FIG. 2.

Referring now to FIG. 7, there is illustrated diagrammatically yet another embodiment of fluid pressure braking system which is similar to that described above with reference to FIG. 3. The difference is that, in the embodiment shown in FIG. 7 both comparators F and G are connected to respective input terminals of a single switch which incorporates a suitable time delay mechanism and which controls the energisation of the solenoid windings of both solenoid operated control devices A and B. Thus an output signal from either comparator F or G switches on the switch N after the elapse of the time delay and energises the solenoid windings of both solenoid operated control devices A and B to release the brakes from both wheels, and hold those brakes released until the magnitude of the signal from the sensor D and the magnitude of the signal from the sensor E both exceed the magnitude of the signal emitted by the offset device M. It will be appreciated that this embodiment may be applied to control the application of the brakes to any number of wheels of a vehicle, the signal generating means C being arranged to receive signals indicative of the angular velocity of each wheel from a respective wheel speed sensor via a respective store and decay device which stores the peaks of the signals indicative of the angular velocity of the respective wheel and emits a signal which comprises the stored links interconnected by suitable decay links. The reference signal generating means C selects the signal indicative of the angular velocity of the fastest of the wheels, rejects the other signals it receives, and passes the selected signal to the offset device M. There is a comparator for each wheel, each comparator comparing the output from the offset device M with the signal indicative of the angular velocity of the respective wheel and switching the switch N if the signal indicative of the speed of the respective wheel is less than the output signal from the offset device M for a period greater than the time delay. When the switch N is switched by a signal from any one of the comparators, all the solenoid windings of all the solenoid operable devices are energised so that the brakes are released from all the wheels.

The invention may be employed to provide an override control for one or more antilock control systems based upon a comparison of the angular velocity of one or more of each of any number of the wheels of the vehicle with a reference signal, if desired. The wheels compared may be associated with one or the other of the two antilock control systems described above, or may be associated with a further one or more antilock control system. The reference signal may be derived from any one or any combination of the angular velocities of the wheels. For example the reference signal may be derived from the mean of the angular velocities of all the wheels of the vehicle, the peaks of the mean signal being interconnected by suitable decay links to form the reference signal. One other possible reference signal may be defined as follows:

$$\frac{R1}{2} + \frac{R2}{4} + \frac{F2}{4}$$

where R1 is the angular velocity of one rear wheel of a four-wheeled vehicle, R2 is the angular velocity of the other rear wheel of the vehicle F2 is the angular velocity of one of the front wheels, the other front wheel, F1 being the slowest wheel of the vehicle.

Where the reference signal is derived from a single wheel of the vehicle it may be computed from the speed of the vehicle when a wheel of the vehicle first tended to skid. Alternatively it may be derived from the angular velocity of a wheel which is not the slowest wheel of the vehicle.

The reference signal may be produced by any convenient means, such as a decelerometer, and need not be derived from the angular velocity of one or more wheels of the vehicle.

I claim:

1. An anti-skid brake control system for a vehicle having a plurality of wheels having brakes associated therewith comprising: means for sensing the wheel speed of at least one of a plurality of vehicle wheels and generating wheel speed signals in response thereto, first means responsive to at least one of said wheel speed signals for releasing the brake pressure at the wheel associated with said wheel speed sensing means when wheel deceleration exceeds a predetermined amount, second means responsive to the wheel speed signal of said associated wheel for reapplying the brake pressure at said associated wheel when wheel speed approaches the speed it would have been doing had wheel slippage not occurred, third means responsive to at least one of said wheel speed signals for generating a vehicle speed related reference signal, and comparison means for comparing the wheel speed signal of said associated wheel and the vehicle speed related reference signal and inhibiting reapplication of brake pressure at the associated wheel via said second means when the vehicle speed signal exceeds the wheel speed signal of the associated wheel by a second predetermined amount for a predetermined time interval.

2. An anti skid brake control system as claimed in claim 1, wherein the reference signal is computed from the angular velocity of at least one wheel of the vehicle.

3. An anti skid brake control system as claimed in claim 2, wherein the reference signal with which the signal indicative of the angular velocity of one wheel of the vehicle is compared is computed from the angular velocity of at least one of the other wheels of the vehicle.

4. An anti skid brake control system as claimed in claim 1, wherein the peaks of each signal indicative of the angular velocities of each wheel from which the reference signal is computed are stored in a respective capacitor, and a constant current generator is associated with each capacitor in order to control the discharge of the capacitor.

5. An anti skid brake control system as claimed in claim 4, wherein the discharge from each capacitor is determined by the setting of a respective variable resistor.

6. An anti skid brake control system as claimed in claim 5, wherein the resistance of each variable resistor is set by a common slope control device.

7. An anti skid brake control system as claimed in claim 6, wherein the resistance of each variable resistor is fixed by the common slope control device so as to correspond to a predetermined deceleration of the vehicle.

8. An anti skid brake control system as claimed in claim 1, wherein the controlled discharge from each capacitor to which were fed the signals indicative of the angular velocities of each wheel from which the reference signal is computed is fed to a combined summation, amplification and inversion device which adds together the various signals it receives from the capacitors, inverts and amplifies the resultant signal and transmits the inverted amplified signal to a comparator where it is compared with the signal indicative of the angular velocity of said one wheel.

9. An anti skid brake control system as claimed in claim 8, wherein each capacitor is connected to the combined summation, amplification and inversion device via switching means, the arrangement being such that the shape of the reference signal is dependent upon the setting of the switching means.

10. An anti skid brake control system as claimed in claim 8, wherein the combined summation, amplification and inversion device includes a feedback circuit and means for changing the resistance of the feedback circuit so as to influence the magnitude of the inverted amplified signal.

11. An anti skid brake control system as claimed in claim 10, including a potentiometer which has its pointer connected to the comparator to supply said third signal.

12. An anti skid brake control system as claimed in claim 8, wherein the sum of the inverted amplified signal and the signal indicative of the angular velocity of said one wheel is compared with a third signal in the comparator, the third signal being representative of said predetermined amount.

13. An anti skid brake control system as claimed in claim 8, wherein the output of the comparator is connected through a time delay circuit to the means arranged to regulate operation of the brakes applied to said one wheel, the time delay circuit being arranged to transmit an output signal from the comparator to the brake regulating means so as to actuate the brake regulating means for release of the associated brakes, and so that initiation of transmission of a signal to the brake regulating means is delayed for said predetermined interval of time, there being no delay in cessation of the signal transmitted to the brake regulating means after cessation of the output signal from the comparator.

14. An anti skid brake control system as claimed in claim 13, wherein the time delay circuit includes an input terminal connected in parallel to two inputs of an AND gate, the input terminal being connected to one of the inputs of the AND gate via resistance means, capacitance means having one terminal connected between the resistance means and said one input so as to be charged by current flowing from said input terminal to said one input via said resistance means, and a shunt circuit in parallel with the resistance means providing a shunt connection between the input terminal and said terminal of the capacitance means, the shunt circuit including a diode which permits free discharge of the capacitance means to the input terminal but which prevents current flow from the input terminal via the shunt circuit to charge the capacitance means, the arrangement being such that initiation of an output signal from the AND gate is delayed for a period after initial receipt of a signal at the input terminal until the capacitance means is charged sufficiently for the voltage at said one input of the AND gate to match the voltage at the other input and such that there will be no output signal from the AND gate unless a signal is being received at the input terminal.

15. An anti skid brake control system as claimed in claim 1, wherein the second predetermined amount by which the magnitude of the reference signal must exceed the magnitude of the signal indicative of the angular velocity of a wheel before operation of the electrical system associated with that wheel is modified is selected so as to allow for the difference between the angular velocities of two coaxial wheels as the vehicle is cornering.

* * * * *